United States Patent
Hasegawa et al.

(10) Patent No.: US 6,490,827 B2
(45) Date of Patent: Dec. 10, 2002

(54) BIODEGRADABLE TRAY FOR RAISING SEEDLINGS

(75) Inventors: Osamu Hasegawa, Chiba (JP); Yojiro Ohno, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/790,735

(22) Filed: Feb. 22, 2001

(65) Prior Publication Data

US 2001/0022048 A1 Sep. 20, 2001

(30) Foreign Application Priority Data

Feb. 29, 2000 (JP) .......................... 2000-053953
Jul. 31, 2000 (JP) ....................... 2000-231778

(51) Int. Cl.⁷ ................................. A01G 9/02
(52) U.S. Cl. ..................................... 47/65.7
(58) Field of Search ................ 47/65.7; 162/157.5, 162/387; 206/521.1; 220/23.4; 229/406

(56) References Cited

U.S. PATENT DOCUMENTS 4,088,259 A * 5/1978 Sutton ..................... 206/521.1
5,347,753 A * 9/1994 Dall ........................... 47/65.7

FOREIGN PATENT DOCUMENTS

| JP | 7-327507 | 12/1995 |
| JP | 10-067876 | 3/1998 |
| JP | 10-225235 | 8/1998 |
| JP | 10-311000 | 11/1998 |
| JP | 10-323810 | 12/1998 |
| JP | 11-227110 | 8/1999 |

* cited by examiner

Primary Examiner—Charles T. Jordan
Assistant Examiner—Francis T. Palo
(74) Attorney, Agent, or Firm—Knobbe, Martens, Olson & Bear, LLP

(57) ABSTRACT

A biodegradable tray for raising seedlings is obtained by obtaining a pulp mold from pulp slurry by suction molding and hot pressing after the molding. Thus, there is provided a biodegradable tray for raising seedlings composed of a pulp mold that has superior mechanical strength and dimensional accuracy during use and can easily be degraded after raising seedlings.

13 Claims, No Drawings

BIODEGRADABLE TRAY FOR RAISING SEEDLINGS

BACKGROUND OF THE INVENTION

1. Field of the Invention

The present invention relates to a biodegradable tray for raising seedlings, which is used for raising plant seedlings or tissue culture. More precisely, it relates to a biodegradable tray for raising seedlings, which is composed of a pulp mold that is obtained by suction molding of pulp slurry.

2. Description of the Related Art

As trays, sheets or pots used for raising plant seedlings, plastic trays for raising seedlings are generally used. However, they suffer from the problem of disposal after use.

For example, there has been proposed a tray for raising seedlings which is obtained by lining up and arranging a suitable number of seedling housing units made of plastic having flexibility and elasticity in the longitudinal and transverse directions, connecting top peripheral edges of the openings of the adjacent seedling housing units, and providing dish-like parts downwardly protruding at the bottom of the seedling housing units, wherein the dish-like parts can freely protrude upwardly (Japanese Patent Laid-open (Kokai) No. 7-327507/1995). However, this tray for raising seedlings applies much load on the environment upon disposal because it uses plastic.

Therefore, trays consisting of pulp molds obtained by suction molding of pulp slurry have been developed. However, they suffer from problems of low strength and so forth.

Meanwhile, as a pulp mold having superior mechanical strength and good dimensional accuracy, there has been proposed a pulp mold produced by wet suction molding of pulp as a raw material, which comprises fine fibers having 150–500% of water retaining capacity defined in JAPAN TAPPI No. 26–78 (Japanese Patent Laid-open (Kokai) No. 10-311000/1998). Although use of this pulp mold is not particularly limited, it is to be mainly used as a packaging material, and use for tray for raising seedlings is not suggested.

Further, there has also been proposed a method for raising seedlings, wherein seedlings are raised in biodegradable cells placed in a conventionally used plastic tray (Japanese Patent Laid-open (Kokai) No. 10-225235/1998) and a product in which a thin film of non-biodegradable substance is formed on a surface of a biodegradable plastic article (Japanese Patent Laid-open (Kokai) No. 11-227110/1999). However, since they use a biodegradable plastic as a main component, they suffer from a problem that they must be expensive materials at present.

Furthermore, there has also been proposed a plastic mold composed of a mixture of 95–60 mass % of biodegradable plastic and 5-40 mass % of coconut shell (Japanese Patent Laid-open (Kokai) No. 10-67876/1998) and a biodegradable material obtained by kneading 51–70 mass % of biodegradable resin and 30–49 mass % of paper powder (Japanese Patent Laid-open (Kokai) No. 10-323810/1998). However, since they contain 30% or more of biodegradable plastic component, they also suffer from a problem that they must be expensive materials.

In reply to this situation, there has been proposed a biodegradable molded product obtained by heat adhesion of non-woven fabric consisting of a mixture of biodegradable fibers and cellulose fibers as a material, which can be produced at a relatively low cost (Japanese Patent Laid-open (Kokai) No. 9-272760/1997). However, since it mainly consists of a non-woven fabric, it is considered difficult to make it have a three-dimensional structure by molding.

SUMMARY OF THE INVENTION

The present invention was accomplished in view of the aforementioned problems, and its object is to provide a tray for raising seedlings, which is composed of a pulp mold that has superior dimensional accuracy, maintains its strength in use for a long period of time, is easily degraded after raising seedlings, and thus applies fewer loads on the environment.

The inventors of the present invention assiduously studied in order to achieve the aforementioned object. As a result, they found that mechanical strength and dimensional accuracy of a tray for raising seedlings, which is composed of a pulp mold, can be improved by subjecting the pulp mold for the tray to hot pressing after molding, and further found that the mechanical strength and dimensional accuracy can further be improved and the tray can be easily degraded after raising seedlings if a biodegradable resin is added to a pulp slurry for the tray. Thus, they accomplished the present invention.

That is, the present invention provides the followings.

(1) A biodegradable tray for raising seedlings, which is composed of a pulp mold obtained from pulp slurry containing a biodegradable resin by suction molding and hot pressing after the molding.

(2) The biodegradable tray for raising seedlings according to (1), wherein the biodegradable resin consists of one of resins selected from glycol-dicarboxylic acid polycondensates, polylactides and polylactones, which are aliphatic polyesters, or a mixture of two or more of them.

(3) The biodegradable tray for raising seedlings according to (1) or (2), wherein the content of the biodegradable resin is 25 mass % or less based on main material components.

(4) The biodegradable tray for raising seedlings according to any one of (1)–(3), wherein the pulp slurry contains an anitifungal agent.

(5) The biodegradable tray for raising seedlings according to any one of (1)–(4), wherein the pulp slurry contains a water-repellant and/or a waterproofing agent.

BEST MODE FOR CARRYING OUT THE INVENTION

Hereafter, the present invention will be explained in detail.

The tray for raising seedlings of the present invention is composed of a pulp mold that is obtained from pulp slurry by suction molding and hot pressing after the molding.

Raw material of the pulp slurry is not particularly limited, and may be any material used in the conventional pulp mold manufacturing process, for example, mechanical pulp, ground pulp, chemical pulp, soda pulp, used paper pulp, dissolving pulp, bast pulp, synthetic pulp or the like. In the present invention, used paper pulp obtained by fibrillating used paper, such as used newspaper, magazines and copy paper or corrugated paper, may be preferably used. Used paper containing a heat fusible resin and so forth can also be used.

The biodegradable resin used for the present invention includes naturally occurring polymers and synthetic polymers. Examples of the naturally occurring polymers that are biodegradable resins include polysaccharides produced by plants, such as cellulose, starch and alginic acid; polysaccharides produced by animals, such as chitin and hyaluronic acid; proteins produced by animals, such as collagen and albumin; polyesters produced by microorganisms, such as poly(3-hydroxyalkanoate); polysaccharides produced by microorganisms, such as hyaluronic acid, and so forth.

Examples of the synthetic polymers that are biodegradable resins include glycol-dicarboxylic acid polycondensates such as polyethylene succinate and polybutylene succinate; polylactides such as polyglycolic acid and polylactic acid; polylactones such as poly($\epsilon$-caprolactone); aliphatic polyesters such as polybutylene terephthalate and adipate; polyols such as polyvinyl alcohol; polycarbonates such as polyester carbonate; poly acid anhydrides, polycyanoacrylates, polyorthoesters, polyphosphazenes and so forth.

Among these, polylactides (polyglycolic acid, polylactic acid etc.) are further preferred, and polylactic acid is particularly preferably used, since it can be obtained from starch and it has a property that it is decomposed into carbon dioxide and water when discarded.

Although the shape of the biodegradable resin is not particularly limited, fibrous resins are usually used.

The content of the biodegradable resin is 25 mass % or less, preferably 10 to 20 mass %, based on main material components.

In the present invention, "main material components" include the biodegradable resin, mechanical pulp, ground pulp, and so forth. When the heat fusible resin is used, the heat fusible resin is included in the main material components.

The pulp slurry may contain an antifungal agent. Inclusion of the antifungal agent can prevent propagation of microorganisms such as fungi in the tray for raising seedlings during use. The amount of the antifungal agent is generally 5 parts or less, preferably 0.5–3 parts by weight based on 100 parts by weight of the total main materials.

In addition, the pulp slurry may contain a water-repellant, waterproofing agent, or both of them. Inclusion of a water-repellant or waterproofing agent can prevent deformation or destruction of the pulp mold caused by water absorption during use. The amount of the water-repellant or waterproofing agent is generally 5 parts or less, preferably 0.5–5.0 parts by weight based on 100 parts by weight of the total main materials.

The pulp slurry may contain other additives such as a dry mechanical strength enhancing agent, wet mechanical strength enhancing agent, pH modifier and so forth so long as the advantages of the present invention are not degraded. The amount of the additives is generally 5 parts or less, preferably 0.5–3 parts by weight based on 100 parts by weight of the total main materials.

Further, the pulp slurry may contain a conventional heat fusible resin, so long as the biodegradability of the tray for raising seedlings of the present invention obtained by use of the biodegradable resin is not substantially deteriorated. The content of the heat fusible resin is preferably 25 mass % or less, more preferably 20 mass % or less, based on the main material components.

The biodegradable tray for raising seedlings of the present invention is a tray for raising seedlings, which is obtained by suction molding of pulp slurry containing the biodegradable resin thus obtaining a pulp mold and then hot-pressing the pulp mold after the molding. Since the biodegradable resin plays a role of binder, mechanical strength and dimensional accuracy of the tray are improved.

The tray for raising seedlings may be produced, for example, as follows. Pulp slurry materials including the main raw materials such as used paper and a biodegradable plastic, are fibrillated in an aqueous solution and added with various additives as required to obtain a suspension. While the solid content of the suspension is not particularly limited, the content of the raw materials is normally from 0.5–10 mass %, preferably 2–5 mass %, based on the pulp slurry. Nutrients required for raising seedlings by using the tray of the present invention may be added to the suspension at this point.

After the obtained suspension is transferred to a paper making tank, it is added with water in such an amount that the concentration of the raw materials should be lowered to about 2 mass % to obtain pulp slurry. Using the obtained pulp slurry, a pulp mold is produced by suction molding using metallic molds. The shape of the metallic molds is not particularly limited and may be in any shape so long as the molded product can be used as trays for raising seedlings in a shape of pot, sheet or the like.

Then, the pulp mold is molded by suction using a vacuum pump or the like. Thereafter, the pulp mold is dried by hot air blow at 80–130° C. for 8–16 hours using a blower type drier or the like so that the moisture content in the pulp mold becomes about 0–5 mass %.

Further, the pulp mold is left in a room for about 24 hours (temperature of about 20–30° C. and humidity of about 40–60% RH) to make the moisture content in the pulp mold equable.

Subsequently, the above pulp mold is subjected to hot pressing. The temperature of the hot pressing is generally 100–300° C., preferably 150–200° C. The pressure is generally 5–100 kg/cm$^2$, preferably 30–50 kg/cm$^2$. The pressing time is generally 5–60 seconds, preferably 5–10 seconds.

The tray for raising seedlings of the present invention is usually a tray having a plurality of cells for multiple seedlings. However, it may be divided for use into single cells each for single seedling. Further, it may be cut for each seedling after seedlings are raised, and used for subsequent processes.

The biodegrading period of the tray for raising seedlings of the present invention can be controlled by the content of a biodegradable resin in the pulp mold. Further, by controlling the biodegrading period, the problem of disposal can be solved.

EXAMPLES

Hereafter, the present invention will be explained in more detail with reference to the following examples and comparative examples.

In the following examples and comparative examples, the term "main material ratio" means a mass ratio of each main material relative to the total amount of the main materials, and "additive ratio" means the amount of the additive by weight based on 100 parts by weight of the total main materials, which is represented by "parts by weight", unless otherwise indicated. The main material ratio does not include the additive ratio.

Example 1

Raw materials (used newspaper: 81 mass %, polylactic acid fibers (Cargill Co.): 19 mass %) were disaggregated in an aqueous solution (concentration: 4 mass %) using a fibrillating machine. The mixture was added with the various additives shown in Table 2, sufficiently disaggregated to obtain a suspension. This suspension was transferred to a paper making tank, then added with water so as to lower the concentration to 2 mass %, and thoroughly dispersed to obtain pulp slurry. Then, a metallic mold for a pulp mold for a tray for raising seedlings, which has a length of 580 mm, a width of 280 mm and a height of 64 mm, was immersed into the stirred slurry by using a pulp mold molding machine, and the pulp slurry was adsorbed and laminated on the metallic mold by vacuum suction. Then, the metallic mold was pulled up from the slurry and turned by 180 degrees. The pulp mold had a structure where cells of 3.5 cm in length, 3.5 cm in width, and 5.8 cm in height (inner volume of about 70 cm$^3$) were arranged in 6 columns lengthwise and 12 rows crosswise (72 cells in total) when it was observed from the top.

The adsorbed and laminated pulp mold was turned upward with suction, and an upper mold with vacuum suction was put on the pulp mold from above. Simultaneously, the suction pressure of the lower metallic mold was released. Then, positive pressure was given to transfer the pulp mold to the upper mold. Thereafter, the pulp mold was removed from the upper mold and dried with hot air blow to obtain a pulp mold for a tray for raising seedlings, which has the moisture content of 7 mass % and the average thickness of about 3 mm. The obtained pulp mold for the tray for raising seedlings was conditioned for moisture content by leaving it under the conditions of 25° C. and 60% RH for 24 hours.

The dried pulp mold for a tray for raising seedlings was held between a pair of metallic molds having precise tray shapes (male mold and female mold) from the upper side and the bottom side of tray, and subjected to hot pressing (200° C., 40 kg/cm$^2$, 10 seconds) to obtain a pulp mold for a tray for raising seedlings.

In addition, as Comparative Example 1, a pulp mold for a tray for raising seedlings was produced in the same manner as above except that used newspaper (81 mass %) and PE (polyethylene) fibers (product name: SWP, Mitsui Petrochemical Industries, Ltd., 19 mass %) were used as the raw materials.

Main material components of the pulp molds for tray for raising seedlings are shown in Table 1.

As the additives, used were an acrylic resin (Arakawa Chemical Industries Ltd.) as a dry mechanical strength enhancing agent, rosin (Arakawa Chemical Industries Ltd.) as a waterproofing agent, a polyolefin derivative (Saiden Chemical Industry Co., Ltd.) as a water-repellant, aluminum sulfate (Oji Paper Co., Ltd.) as a pH modifier, a polyamide resin (Arakawa Chemical Industries Ltd.) as a wet mechanical strength enhancing agent, and organic azotic compound (K.I Chemical Industry Co., Ltd.) as an antifungal agent.

TABLE 1

Main material components

|  | Composition | Main material Ratio (mass %) |
|---|---|---|
| Example 1 | Used newspaper | 81% |
|  | Biodegradable resin | 19% |
| Comparative Example 1 | Used newspaper | 81% |
|  | PE fibers | 19% |

TABLE 2

Composition of additives

| Additive | Additive ratio (parts by weight)[*1] |
|---|---|
| Dry mechanical strength enhancing agent | 1.0 |
| Water-repellent | 3.0 |
| pH modifier | 2.5 |
| Wet mechanical strength enhancing agent | 0.5 |
| Antifungal agent | 1.0 |

[*1]Mass ratio of the addition amount based on 100 parts by weight of the total main materials (parts by weight).

Further, a conventional plastic tray made of PP (polypropylene) was used as Comparative Example 2. The aforementioned three kinds of trays for raising seedlings were evaluated as follows.

Biodegradation Test 1

Biodegradability was measured according to JIS K 6950: Test Method for Aerobic Biodegradability by Plastics—Activated Sludge, for three kinds of samples including the two kinds of pulp mold products for a tray for raising seedlings, which were produced by the aforementioned methods, and the plastic tray. The biodegradation rate was calculated according to the following equation by using a remained weight after degradation.

Formula (1) Biodegradation rate=[(Original weight−Remained weight)/(Original weight)]×100

The results of the biodegradation test for the two kinds of pulp mold trays (Comparative Example 1, Example 1), and for the conventional plastic tray (Comparative Example 2) are shown in Table 3. As clearly seen from the results, it can be said that, while the plastic tray (Comparative Example 2) was not degraded at all, the degradation rate of the tray utilizing the pulp as the main component (Comparative Example 1) is clearly higher. It can further be seen that the degradation rate sharply increased when the biodegradable resin was used as a binder (Example 1).

TABLE 3

Biodegradation rate

| Number of Day | Example 1 | Comparative Example 1 | Comparative Example 2 |
|---|---|---|---|
| 10 | 74% | 50% | 0% |
| 20 | 95% | 67% | 0% |
| 28* | 100% | 80% | 0% |

*Evaluation days according to JIS

In the above test, the degradation rate could be definitely confirmed since the activated sludge was used. It was considered preferable to perform a further field test, in which the samples were left in ordinary soil.

Biodegradation Test 2

Therefore, the samples produced above were buried in soil designed for agricultural purposes, and biodegradation rate was measured. The soil used was present in the field of the Research and Development Center of NISSHINBO INDUSTRIES, Inc. The samples were left in the soil for 2 months, and then the weights were measured. The biodegradation rate was calculated according to the aforementioned Formula (1).

The results of the biodegradation test for the pulp mold trays (Comparative Example 1, Example 1), and the conventional product (Comparative Example 2) are shown in Table 4. As clearly seen from the results shown in Table 4, the tray for raising seedlings of the present invention showed superior biodegradability.

TABLE 4

Biodegradation rate

|  | Example 1 | Comparative Example 1 | Comparative Example 2 |
|---|---|---|---|
| After 2 months | 20% | 5% | 0% |

Mechanical Strength Measurement Test

Mechanical strength was measured for the produced pulp mold trays (Comparative Example 1, Example 1) and for the plastic tray (Comparative Example 2), using each sample of them "before raising seedlings" and "after raising seedlings" (raising term: 1 month). A portion of each sample (length: 50 mm, width: 10 mm) was collected from its side wall and used as a specimen. As for each specimen, the three-point bending test was performed by using a tensile tester (Instron 5544, Instron Japan Co.). The measurement was performed at a cross-head speed of 5.0 mm/min, and maximum stress (Pa) and modulus of elasticity (Pa) at a yield point were measured. The results are shown in Table 5.

As seen from the results, although a slight decrease of the strength was confirmed after raising seedlings, when pulp was used as the main component (Example 1, Comparative Example 1), it was not an extreme degradation. There was no strength change in the plastic tray (Comparative Example 2). Thus, it was confirmed that the tray for raising seedlings of the present invention did not show extreme strength degradation during the period of raising seedlings.

TABLE 5

Results of 3-point bending test

|  |  | Maximum Stress (Pa) | Modulus of Elasticity (Pa) |
|---|---|---|---|
| Example 1 | Before raising seedlings | $1.99 \times 10^7$ | $1.28 \times 10^9$ |
|  | After raising seedlings | $1.64 \times 10^7$ | $1.23 \times 10^9$ |
| Comparative Example 1 | Before raising seedlings | $2.00 \times 10^7$ | $1.39 \times 10^9$ |
|  | After raising seedlings | $1.94 \times 10^7$ | $1.33 \times 10^9$ |
| Comparative Example 2 | Before raising seedlings | $1.23 \times 10^7$ | $2.97 \times 10^9$ |
|  | After raising seedlings | $1.23 \times 10^7$ | $2.97 \times 10^9$ |

According to the present invention, there can be provided a biodegradable tray for raising seedlings that has superior mechanical strength and dimensional accuracy during use and can easily be degraded after raising seedlings.

Having thus described the present invention, it will be obvious that the same may be varied in various ways. Such variations are not to be regarded as departure from the spirit and scope of the invention, and all such modifications would be obvious for one skilled in the art intended to be included within the scope of the following claims.

What is claimed is:

1. A biodegradable tray for raising seedlings, comprising a main structure composed of a suction molded, dried, conditioned, hot pressed pulp mold comprising pulp and a biodegradable resin, wherein the biodegradable resin is included at 25 mass % or less based on the main structure.

2. The biodegradable tray for raising seedlings according to claim 1, wherein the biodegradable resin is an aliphatic polyester selected from the group consisting of glycol-decarboxylic acid polycondensates, polylactides, polylactones, and a mixture of the foregoing.

3. The biodegradable tray for raising seedlings according to claim 1, further comprising an antifugal agent.

4. The biodegradable tray for raising seedlings according to claim 1, further comprising at least either one of a water-repellant or a waterproofing agent.

5. The biodegradable tray for raising seedlings according to claim 2, wherein the biodegradable resin included at 25 mass % or less based on the main structure.

6. The biodegradable try for raising seedlings according to claim 2, further comprising an antifungal agent.

7. The biodegradable tray for raising seedlings according to claim 2, further comprising a least either one of a water-repellant or a waterproofing agent.

8. The biodegradable tray for raising seedlings according to claim 3, further comprising at least one of a water-repellant or a waterproofing agent.

9. A method of producing a biodegradable tray for raising seedlings, said tray comprising a main structure composed of a pulp mold, the method comprising the steps of:

preparing a pulp slurry containing a biodegradable resin;

subjecting the slurry to suction molding to obtain the pulp mold;

drying until a moisture content of the pulp mold being 0–5 mass %;

conditioning the pulp mold at a temperature of 20–30° C. and a humidity of 40–60% RH; and hot pressing the pulp mold after conditioning to obtain the biodegradable tray.

10. The method according to claim 9, wherein the biodegradable resin is an aliphatic polyester selected from the group consisting of glycol-decarboxylic acid polycondensates, polylactides, polylactones, and a mixture of the foregoing.

11. The method according to claim 9, wherein the biodegradable resin is included at 25 mass % or less based on the main structure.

12. The method according to claim 9, wherein the slurry contains an antifungal agent.

13. The method according to claim 9, wherein the pulp slurry contains at least either one of a water-repellant or a waterproofing agent.

* * * * *

UNITED STATES PATENT AND TRADEMARK OFFICE
CERTIFICATE OF CORRECTION

PATENT NO.     : 6,490,827 B2                                                      Page 1 of 1
DATED          : December 10, 2002
INVENTOR(S)    : Osamu Hasegawa et al.

It is certified that error appears in the above-identified patent and that said Letters Patent is hereby corrected as shown below:

<u>Column 8,</u>
Line 6, "comprising at least one" should be changed to -- comprising at least either one --
Line 16, "comprising an antifugal agent." should be changed to -- comprising an antifungal agent. --
Line 21, "resin included at 25" should be changed to -- resin is included at 25 --
Line 23, "The biodegradable try for" should be changed to -- The biodegradable tray for --
Line 26, "comprising a least" should be changed to -- comprising at least --

Signed and Sealed this

Fourteenth Day of October, 2003

JAMES E. ROGAN
*Director of the United States Patent and Trademark Office*